United States Patent [19]

Luy et al.

[11] 4,035,692

[45] July 12, 1977

[54] RESISTOR PROTECTION SYSTEMS

[75] Inventors: William R. Luy, Colgate; Merle R. Swinehart, Brookfield, both of Wis.

[73] Assignee: Cutler-Hammer, Inc., Milwaukee, Wis.

[21] Appl. No.: 633,921

[22] Filed: Nov. 20, 1975

[51] Int. Cl.[2] .................................. H02H 7/085
[52] U.S. Cl. .......................... 361/103; 73/362 AR; 318/375; 324/62; 324/64; 361/24; 361/106
[58] Field of Search ............. 317/13 R, 13 B, 13 C, 317/40 R, 41, 33 SC; 324/62, 64, 105, 106, 158 MG, 52; 73/362 AR, 342, 362 R, 359; 323/68, 69; 219/497, 501, 506, 507; 318/375, 376, 273, 274, 209, 87

[56] References Cited

U.S. PATENT DOCUMENTS

| | | | |
|---|---|---|---|
| 3,417,330 | 12/1968 | Murphy, Jr. | 324/62 R |
| 3,622,849 | 11/1971 | Kelly, Jr. et al. | 317/33 SC |
| 3,809,960 | 5/1974 | Jossic | 317/40 R X |
| 3,817,104 | 6/1974 | Sapir | 73/362 AR |
| 3,826,962 | 7/1974 | Morton et al. | 318/376 |
| 3,924,102 | 12/1975 | Hanekom | 219/501 X |
| 3,952,595 | 4/1976 | Poolman et al. | 324/105 X |

Primary Examiner—J D Miller
Assistant Examiner—Patrick R. Salce
Attorney, Agent, or Firm—Hugh R. Rather; William A. Autio; Michael E. Taken

[57] ABSTRACT

A system for protecting an electrical resistor, such as, for example, the dynamic braking resistor of a D.C. traction motor used in a diesel-electric locomotive, from burn-out in the event of a malfunction such as a cooling fan failure or air blockage, over-load, high ambient temperature, etc. Such protection is afforded by a noise-immune system that continuously monitors the resistor temperature and provides an output signal when the resistor temperature reaches a predetermined level above its normal operating temperatures short of an unsafe level. This is done by sensing the change in resistivity of the resistor with change in temperature thereof to provide a first control signal. A second control signal proportional to the current in the resistor is obtained and compared with the first control signal to obtain the aforesaid output signal proportional to the resistor temperature above ambient temperature. This output signal is used to trip the system at the predetermined temperature level thereby to reduce or interrupt the current or perform some other function to protect the resistor from damage. A modified system provides both an output trip signal and temperature readout.

17 Claims, 9 Drawing Figures

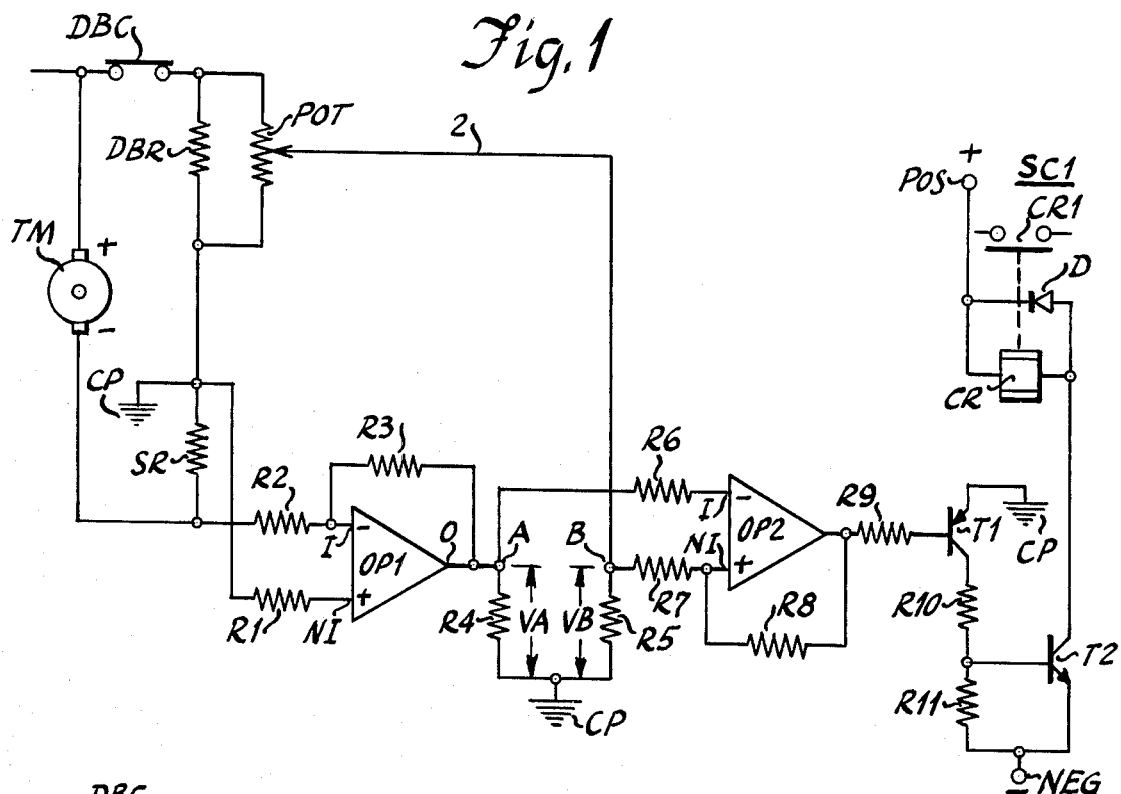
Fig. 1
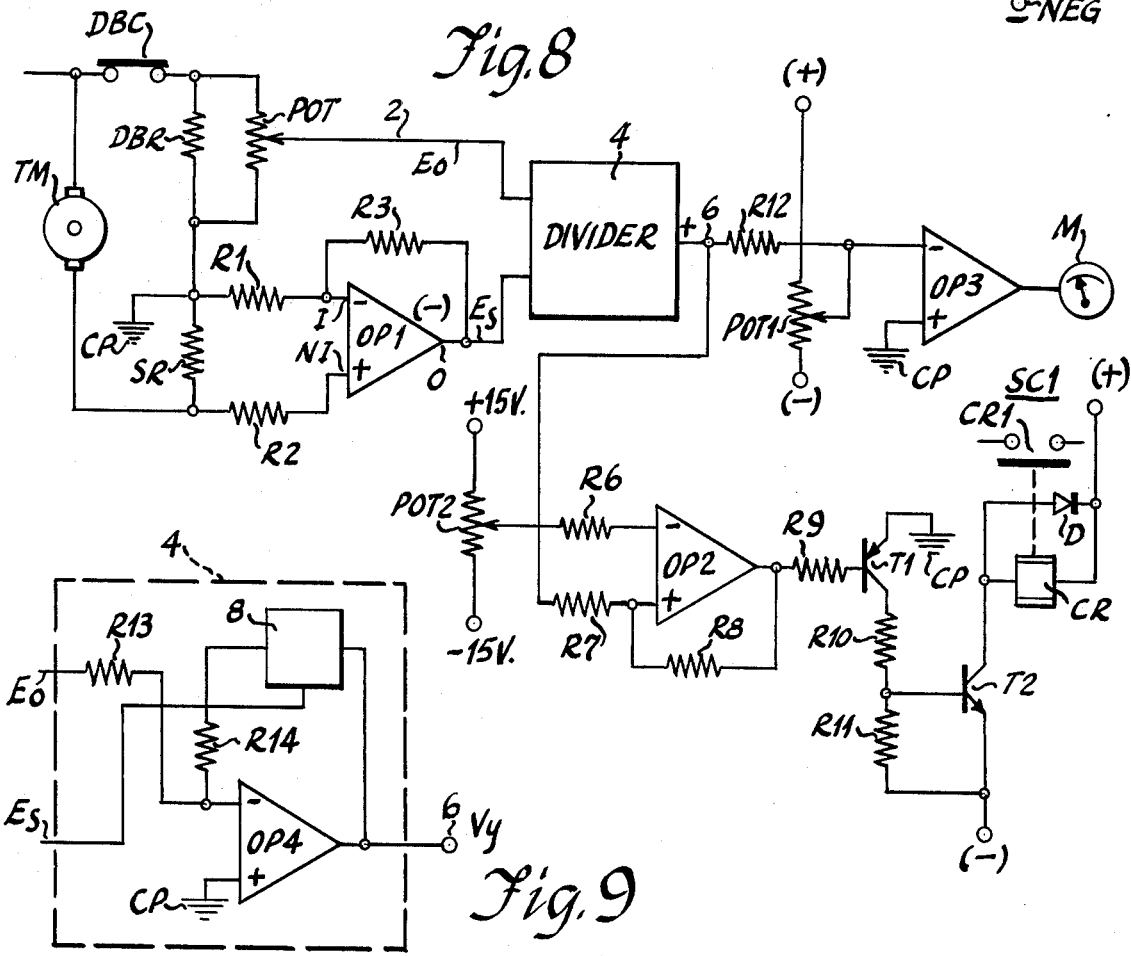
Fig. 8
Fig. 9

RESISTOR PROTECTION SYSTEMS

BACKGROUND OF THE INVENTION

Temperature change responsive resistance measuring and protecting systems have been known heretofore. For example, F. E. Murphy, Jr. U.S. Pat. No. 3,417,330, dated Dec. 17, 1968, discloses a system for indicating current flow proportional to change in resistance of an electrical heating element, a resistor or the like. This current flow may be used to operate an indicator such as a milliammeter or a control device such as an impedance element, an electric relay coil, lamp or alarm, or an electronic switch. Such resistance change is proportional to the temperature of the heating element and thus the system may be used to regulate the temperature of the heating element. These prior systems have had certain disadvantages such as requiring high power comsumption for the sensing and control device, being rather insensitive to small changes in the condition to be sensed, the control device being subject to unwanted temperature variation or subject to vibration, or the like.

While these prior systems have been useful for their intended purpose, this invention relates to improvements thereover.

SUMMARY OF THE INVENTION

An object of the invention is to provide an improved resistor protection system.

A more specific object of the invention is to provide an improved load resistor protection system that makes use of an existing low-power, shunt resistor or stainless steel terminal strap.

Another specific object of the invention is to provide an improved dynamic braking resistor protective system that prevents burn-out of the dynamic braking resistor in the event of cooling fan failure or the like.

Another specific object of the invention is to provide a resistor protective system with improved electronic means that affords a low power consumption system.

Another specific object of the invention is to provide an improved resistor protection system that is immune to electrical "noise".

Another object of the invention is to provide a resistor protection system having a control device that is not subject to vibration or unwanted temperature variation.

Other objects and advantages of the invention will hereinafter appear.

BRIEF DESCRIPTION OF THE DRAWINGS

FIG. 1 is a schematic diagram of a dynamic braking resistor protection system for a diesel-electric locomotive arranged in accordance with the invention;

FIG. 8 is a schematic diagram of a modification of the system of FIG. 1 providing average temperature readout in addition to output control; and FIG. 9 shows details of the divider circuit shown in block form in FIG. 8.

DESCRIPTION OF THE PREFERRED EMBODIMENTS

Figure 2:
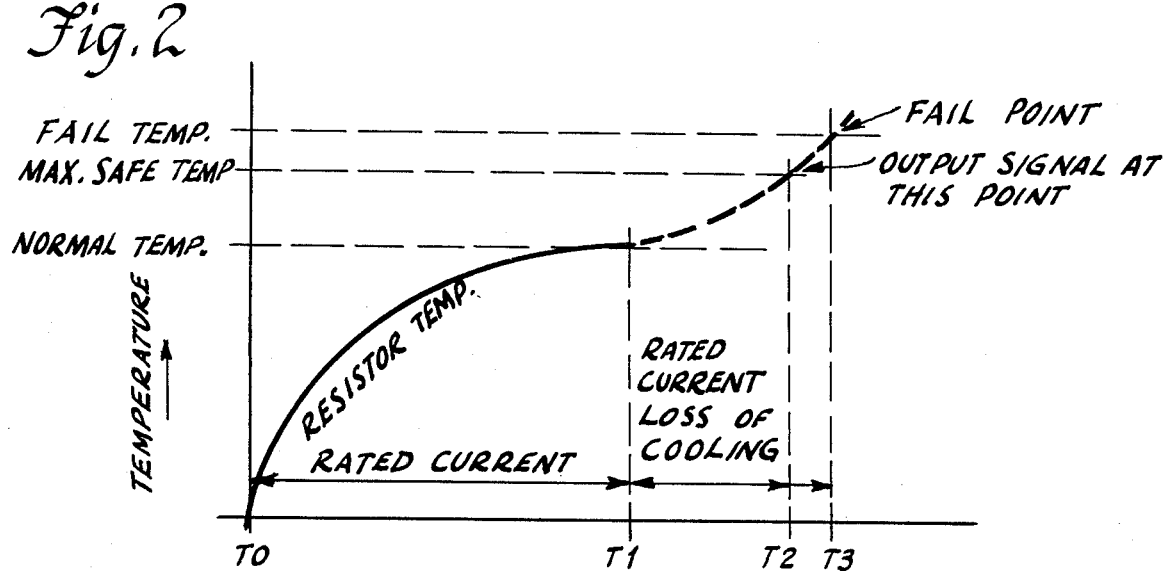
FIG. 2 is a graph showing a dynamic braking resistor temperature curve depicting normal or rated current conditions followed by loss of cooling.

Referring to FIG. 1, there is shown a dynamic braking resistor protection system arranged in accordance with the invention. As shown therein, one side of the armature of a traction motor TM is connected through a dynamic braking contact DBC, a dynamic braking resistor DBR and a current shunt resistor SR to the other side of the armature. Resistor SR is called a current shunt resistor because in its normal use it shunts current from an ammeter connected thereacross. The upper end of shunt resistor SR is connected to the system common point CP. Contact DBC may be operated by a dynamic braking relay or the like to close whenever power is switched off from the traction motor armature so as to effect dynamic braking as hereinafter described. The field winding of the motor is not shown as its connection is well known.

Traction motor TM functions as a D.C. motor to drive a diesel-electric locomotive when electric power is applied thereto. Alternatively, when power is disconnected from this motor armature and contact DBC is closed, this motor while still rotating acts as a generator to effect dynamic braking thereof. For this purpose, current flows from the upper (positive) side of the armature of motor TM through contact DBC, dynamic braking resistor DBR, and shunt resistor SR to the lower (negative) side of the armature of motor TM. This current flow through resistor DBR effects braking of the motor in known manner.

During this braking action, the energy represented by current flow in resistor DBR is dissipated as heat causing the temperature of this resistor to increase. A blower fan is normally used to produce air flow to cool this resistor or to keep the temperature thereof from exceeding a safe value so as to prevent burn-out destruction of this resistor. Should the blower fail, this resistor DBR might overheat and become damaged unless some means is provided to prevent it. While blower failure has been considered herein, other causes could exist that might cause heat damage to this resistor, such as air blockage, overload current, high ambient temperature, etc. This invention protects the resistor regardless of the cause of overheating.

For these reasons, means is provided to monitor the resistor temperature and to initiate protective action when a safe limit is about to be exceeded. This means comprises a potentiometer POT connected across dynamic braking resistor DBR and having an adjustable slider for deriving a voltage on conductor 2 proportional to the voltage across the dynamic braking resistor. The voltage across the dynamic braking resistor is proportional to the dynamic braking current and the resistivity of this resistor. The resistivity is proportional to the temperature of this resistor. Thus, this voltage on conductor 2 may be considered as having two components, one that is proportional to the current flowing in the resistor being monitored and another that is proportional to the average temperature of this resistor. It will, therefore, be seen that if the component of voltage that is proportional to the current flowing in this resistor at ambient temperature can be eliminated, there will be left a voltage proportional to the increase in average temperature of this resistor above ambient temperature. Also, becuase the dynamic braking current is variable depending upon the braking effort, it is desirable to avoid having this current variation affect the temperature monitoring system.

For these reasons, a second voltage proportional to the dynamic braking current at ambient temperature is derived from shunt resistor SR and is used to cancel out the variable current effects. This shunt resistor provides a voltage that linearly follows the dynamic braking current. The upper (grounded) end of this shunt resistor is connected through a resistor R1 to non-inverting (positive) input terminal NI of operational amplifier OP1 and the lower (negative) end of this shunt resistor is connected through a resistor R2 to inverting (negative) input terminal I of this operational amplifier. Since the thermal coefficient of resistance can be negligible in a properly designed shunt such as SR, the voltage across this shunt is dependent on the current flowing therethrough only, this current being the same value as the current flowing in the dynamic braking resistor.

The voltage across the shunt will be compared to the voltage on conductor 2 in such a way that the voltage variations due to current at ambient temperature will cancel out resulting in an output signal that is directly proportional to dynamic braking resistor resistivity change, and thus its average temperature change, as will hereinafter be described in connection with the graphs in FIGS. 2–7. To this end, since the normal voltage of a shunt is quite low when compared to the voltage across a power resistor, it will have to be amplified even through only a portion of the total voltage drop across the DB (dynamic braking) resistor is used. Also, the voltage from the shunt must be inverted because the traction motor common point CP connection is at the upper end of the shunt, that is, between the shunt and the dynamic braking resistor, as shown in FIG. 1. For this reason, the lower end of the shunt that has a variable negative voltage is connected to the inverting input terminal of amplifier OP1. As the DB current increases, the voltage on conductor 2 increases in the positive direction while the voltage at the lower end of shunt SR increases in the negative direction. In order to obtain an effective cancellation, the voltages must increase in the same direction. With the connections shown in FIG. 1, the voltage at the output terminal O of amplifier OP1 increases in the positive direction in proportion to voltage increase in the negative direction at its inverting input terminal I.

A negative feedback resistor R3 is connected between output terminal O and inverting input terminal I to adjust the amplifier gain.

For voltage comparison purposes, the output terminal of amplifier OP1 is connected through a terminal A and a resistor R4 to common point CP and conductor 2 is connected through a terminal B and a resistor R5 to common point CP. The upper, positive voltage ends of resistors R4 and R5 are connected through resistors R6 and R7 to the inverting (negative) and non-inverting (positive) input terminals I and NI, respectively, of operational amplifier OP2, this operational amplifier being used as a voltage comparator. For this purpose, the slider of potentiometer POT is adjusted so that the voltage at terminal B is less than the voltage at terminal A. For example, the voltage at terminal A may be assumed to be at 10 volts and the voltage at terminal B may be set at 9 volts.

The amount of differential required between voltages at terminals A and B is determined by the safe temperature of the dynamic braking resistor that must not be exceeded. The first mode of failure that is reached for a particular resistor will be known by examination of the design parameters and resistance material specifications for thermal coefficient of linear expansion, tensile strength vs. temperature, and melting temperature, etc., of the particular material in use. This data will be modified by other parameters such as vibration, shock, safety factor required, etc. The minimum fail point temperature having been so determined, a protection circuit can be designed having the proper voltage differential.

This voltage differential normally maintains a switching circuit SC1 active. This switching circuit becomes inactivated when the voltage at terminal B increases above a null condition with respect to the voltage at terminal A.

To cause amplifier OP2 to trigger, that is, to change its output voltage abruptly, this amplifier is given a high gain in known manner and its output terminal is connected through a positive feedback resistor R8 to its non-inverting input terminal NI. Thus, whenever, its output voltage goes positive, due to the non-inverting input terminal being more positive than the inverting input terminal, this positive output voltage will be applied through resistor R8 to enhance the differential in the input voltages. This causes the output to avalanche in the positive direction which constitutes triggering of the amplifier.

The state of the comparator OP2 output signal, whether high or low, is determined by the voltage relationship at terminals A and B. With the voltage VA at terminal A greater than the voltage VB at terminal B, the OP2 output is low (about −13V with a ± 15 volt supply). When VB becomes slightly greater than VA which occurs at the maximum safe temperature, the OP2 output triggers high (about +13 volts) and operates the switching circuit. Alternatively, the comparator may be set to trigger at some other set point.

To operate the switching circuit, the output terminal of voltage comparator OP2 is connected through a resistor R9 to the base of a P-N-P conductivity type transistor T1. The emitter of this transistor is connected to common point C and the collector thereof is connected through voltage dividing resistors R10 and R11 to a source of negative voltage NEG. Thus, whenever the voltage at the base is negative, the transistor is held conductive or "on". Whenever the voltage at the base rises to common point potential or positive, this transistor will be rendered non-conductive or "off".

This control transistor T1 drives an N-P-N conductivity type power transistor T2 that, in turn, operates a relay to perform a dynamic braking resistor protective function such as removing power from such resistor, reducing the braking level, lighting a warning lamp, sounding a buzzer, etc. For this purpose, the junction between voltage divider resistors R10 and R11 is connected to the base of transistor T2. The emitter is connected to negative voltage source NEG. And a positive voltage source POS is connected through the coil of a control relay CR to the collector of transistor T2. A unidirectional conducting diode D is connected in reverse-parallel relation across the relay coil to provide a conducting path for current due to the induced voltage of the inductive coil. Control relay CR may have one or more normally-open and normally-closed contacts represented in FIG. 1 by contact CR1 for performing the functions hereinbefore described.

As shown in the curve in FIG. 2, wherein resistor temperature at rated current is plotted against time, the resistor temperature increases from the start of dynamic braking at time TO to a normal temperature level at time T1. Due to loss of cooling at time T1, the resistor temperature begins to increase rapidly until, at time T2, the system provides an output signal to protect the resistor from further heating. Without the protective system the resistor temperature would continue to increase to the fail point at time T3. This output signal is provided when the voltage at terminal B in FIG. 1 rises to substantially 10 volts. This causes the output of comparator OP2 to rise from a negative voltage to positive potential as hereinbefore described. As a result, transistor T1 turns off, causing transistor T2 to turn off and deenergize relay CR. This drop-out of the relay causes its contact CR1 to perform the protective function hereinbefore described.

This is a fail-safe system in that the switching circuit is normally energized and becomes deenergized when comparator OP2 reaches a null condition. Therefore, in the event of circuit failure, protection of the dynamic braking resistor is also initiated.

Figure 3:
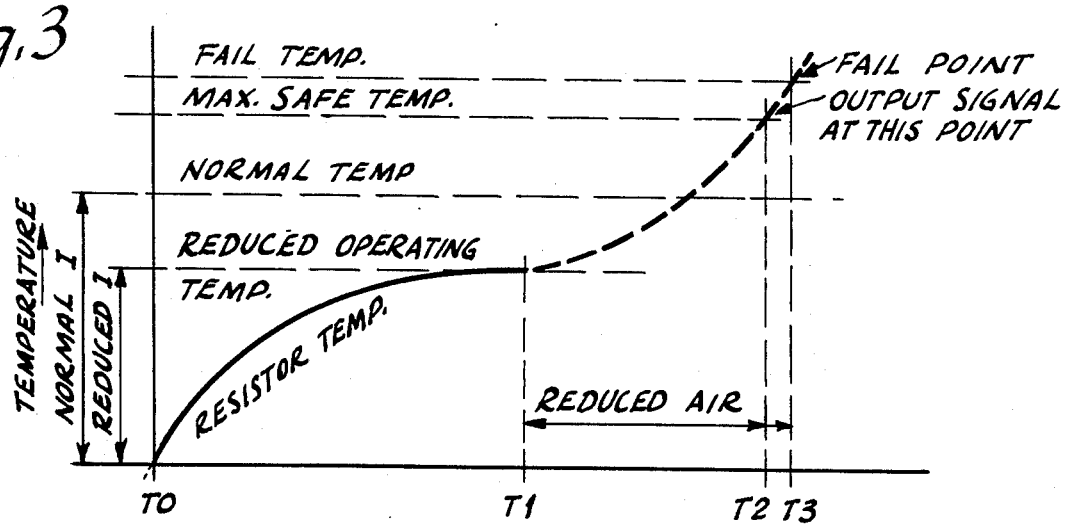
FIG. 3 is a graph showing a dynamic braking resistor temperature curve depicting reduced current conditions and consequent reduced temperature followed by reduced air flow or loss of cooling.

The curve in FIG. 3 shows how the system operates when the resistor is at reduced operating temperature and there is reduced air flow or a loss of cooling. The resistor has reached the reduced operating temperature from time TO to T1 whereat cooling fails. The resistor temperature begins to increase fast, passing its normal temperature until an output signal is provided at time T2, thereby avoiding the fail point at time T3. It took longer for the resistor to reach maximum safe temperature because it was at reduced temperature when the cooling failed.

Figure 4:
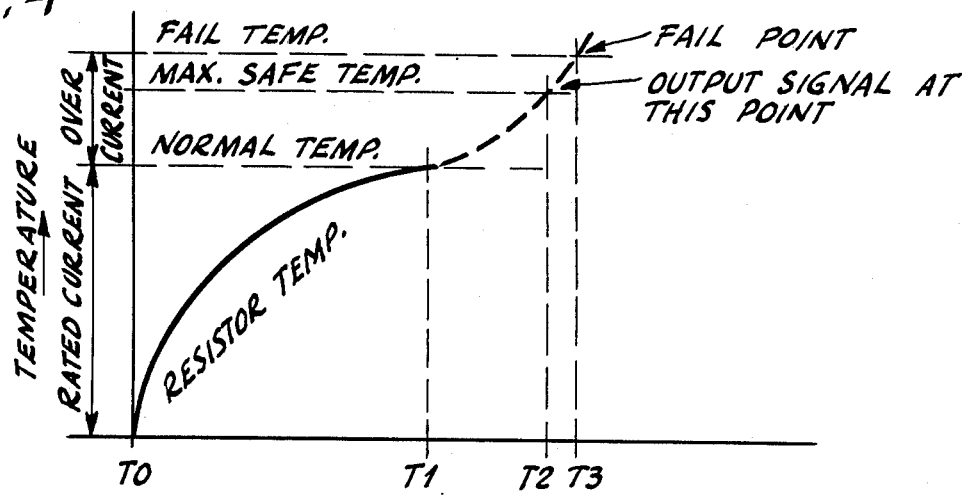
FIG. 4 is a graph showing a dynamic braking resistor temperature curve depicting normal or rated current followed by overcurrent conditions.

The curve in FIG. 4, shows the resistor temperature increasing due to overcurrent. From time TO to T1, the resistor has reached normal temperature. Due to overcurrent, the resistor temperature increases rapidly until an output signal is provided at the maximum safe temperature, short of the fail point.

Figure 5:
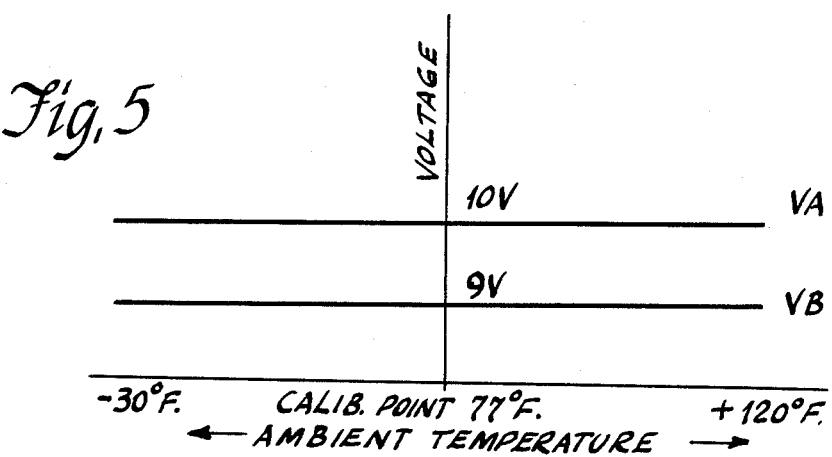
FIG. 5 is a graph showing characteristic curves of a pair of to-be-compared voltages of the system of FIG. 1 and depicting the substantial constancy (only slight variation) therein over ambient temperature changes.

As shown in FIG. 5, wherein the voltages VA and VB, FIG. 1, are plotted against ambient temperatures, these voltages vary only slightly from the values of 10 volts and 9 volts, respectively, at which they are set at the calibration point of 77° F. The difference between these voltages remains substantially the same.

Figure 6:
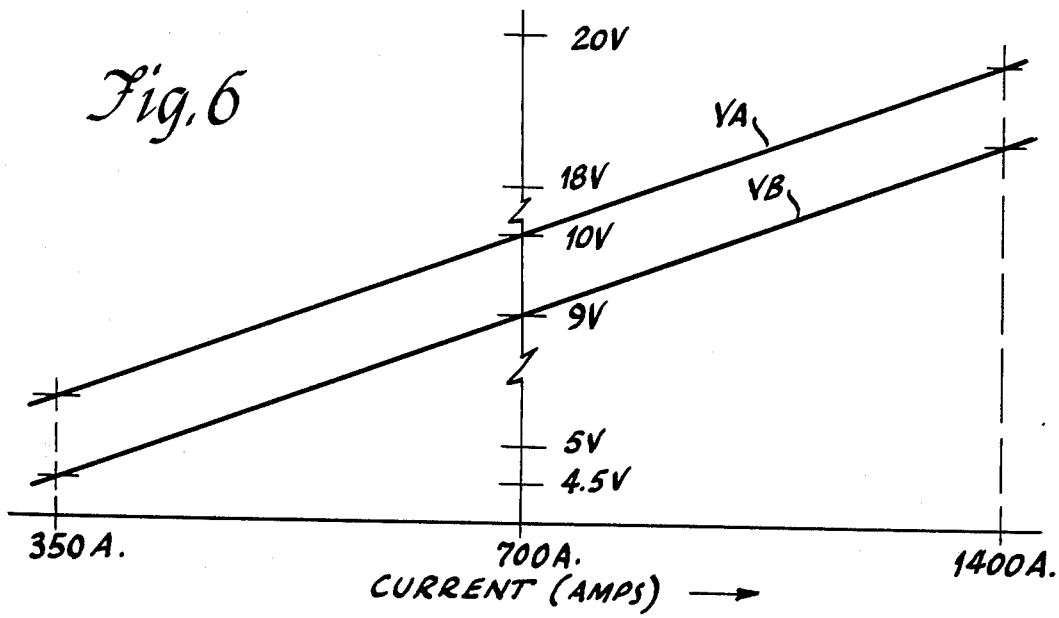
FIG. 6 is a graph showing characteristic curves of the aforesaid pair of voltages and depicting constancy of difference therein over varying current levels, assuming constant resistor temperature.

As shown in FIG. 6, wherein voltages VA and VB are plotted against dynamic braking current in amperes, these voltages vary linearly with the current but the difference therebetween remains constant from 350 to 1400 amperes. This shows that the variable current component of the signal is being cancelled out.

Figure 7:
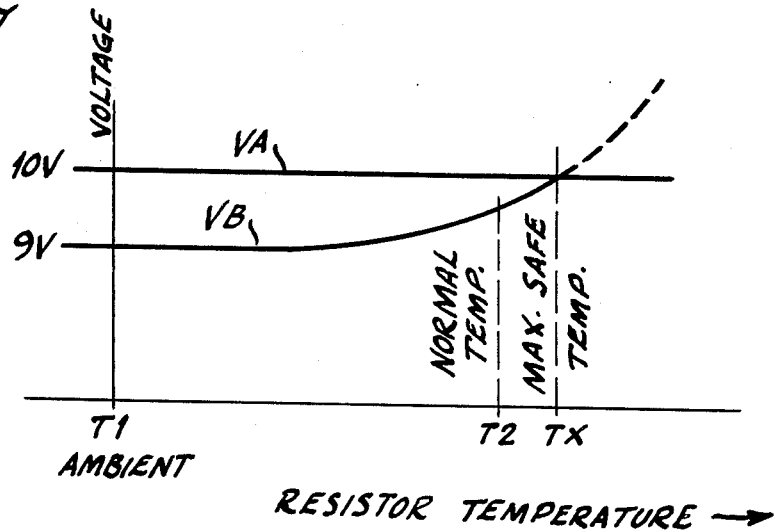
FIG. 7 is a graph showing characteristic curves of the aforesaid pair of voltages and depicting relative change therein in response to increasing resistor temperature with the current maintained constant.

As shown in FIG. 7, wherein voltages VA and VB are plotted against rising resistor temperature at constant current, the voltage at terminal A remains constant while the voltage at terminal B increases until its curve intersects the curve of voltage VA at time TX. This is the maximum safe temperature and at which switching circuit SC1 is operated.

The modification shown in FIG. 8 provides resistor temperature readout as well as tripping at a predetermined temperature level. In FIG. 8 reference characters like those in FIG. 1 have been given for like parts. Thus, the positive side of the armature of traction motor TM is connected through dynamic braking relay contact DBC, dynamic braking resistor DBR to the traction motor common point CP. The negative side of this armature is connected through shunt SR to this traction motor common point. Potentiometer POT is connected across the dynamic braking resistor and its slider is connected to conductor 2 to obtain a voltage Eo. The upper end of shunt SR is connected to resistor R1 and the lower end of shunt SR is connected to resistor R2. All of these connections are the same as in FIG. 1.

In order to provide the proper polarity of signals to a divider circuit 4, the voltage from the series resistor SR is not inverted as in FIG. 1. Thus, resistor R1 is connected to inverting (negative) input terminal I and resistor R2 is connected to non-inverting (positive) input terminal NI of operational amplifier OP1. Negative feedback resistor R3 is connected as in FIG. 1 to adjust the amplifier gain. With these connections, a negative voltage $Es$ appears at output terminal O of the amplifier that is proportional to the voltage across shunt SR.

In order to provide a voltage proportional to the change in ratio of $Eo$ to $Es$, there is provided a divider circuit 4, $Eo$ being the voltage from the dynamic braking resistor appearing on conductor 2 and voltage $Es$ being the voltage from the shunt resistor appearing at the output of amplifier OP1. Thus, the positive voltage $Eo$ on conductor 2 is applied to one input terminal of divider 4. The negative voltage $Es$ from amplifier OP1 is applied to the other input terminal of divider 4. Voltage $Eo$ is initially set equal to voltage $Es$ at ambient temperature by adjusting the slider of potentiometer POT. As a result, divider 4 provides at its output terminal 6 a positive voltage proportional to the voltage change in voltage $Eo$ divided by voltage $Es$.

FIG. 9 shows details of divider circuit 4 of FIG. 8. This divider circuit includes a multiplier 8 in the negative feedback path of an operational amplifier OP4. Resistor R13 is the input resistor to the operational amplifier and resistor R14 is the feedback resistor. Resistor DBR monitoring voltage $Eo$ on conductor 2 in FIG. 8 is applied through resistor R13 to the inverting input terminal of the operational amplifier while the non-inverting input terminal is connected to common point CP. Voltage $Es$ at the output terminal of operational amplifier OP1 in FIG. 8 is applied to one input terminal of voltage multiplier 8. The output voltage $Vy$ of operational amplifier OP4 is applied to the second input terminal of multiplier 8. With this arrangement, the output voltage $Vy$ of this divider circuit will be proportional to the ratio of voltage $Eo$ over negative voltage $Es$.

Circuit 8 is a known multiplier circuit such as, for example, the Motorola MC1595L Multiplier.

Potentiometer POT is adjusted so that the ratio $Eo$ over $Es$ is equal to 1 at ambient temperature which may be, for example, 77° F. The relationship is thus:

$$\frac{Eo}{Es} = [1 + \alpha(T - 77)]$$

where $\alpha$ is the temperature coefficient of resistance of the dynamic braking resistor and T is the temperature of this resistor. For any resistor temperature higher than 77° F, this ratio will be greater than 1. Solving for T, the equation becomes:

$$T = \frac{1}{\alpha} \frac{Eo}{Es} + 77 \frac{-1}{\alpha}$$

Since $1/\alpha$ is essentially a constant K1 and 77 ($-1/\alpha$) is essentially a constant K2, this equation becomes:

$$\frac{T}{K1} = \frac{Eo}{Es} + K2$$

Therefore, the temperature is proportional to the voltage at output terminal 6 plus a constant K2. This constant K2 is added in FIG. 8. To this end, output terminal 6 is connected through a resistor R12 to the inverting input terminal of operational amplifier OP3 while the non-inverting input terminal thereof is connected to common point CP. A potentiometer POT1 is connected across a positive and negative voltage source. The slider of this potentiometer is connected to the inverting input terminal of amplifier OP3. This slider may be adjusted to add a voltage approximately proportional to the aforesaid constant K2. Therefore, the output voltage of amplifier OP3 is proportional to the dynamic braking resistor average temperature and this temperature is indicated as a readout on meter M.

Switching circuit SC1 is similar to that in FIG. 1. However, in this modification in FIG. 8, a potentiometer POT2 is connected between plus 15 volts D.C. and minus 15 volts D.C. and its slider is connected through resistor R6 to the inverting input terminal of operational amplifier OP2. Output terminal 6 of divider 4 is connected through resistor R7 to the non-inverting input terminal of amplifier OP2. The sider of potentiometer POT2 is set so that the voltage at the inverting input terminal is initially higher than the voltage at the non-inverting input terminal. As a consequence, the output voltage of amplifier OP2 is low and turns transistor T1 "on" as hereinbefore described in connection with FIG. 1.

Now, when the dynamic braking resistor heats and the voltage at terminal 6 rises so that a null condition is reached at the input of amplifier OP2, or the voltage on the non-inverting input terminal exceeds the voltage on the inverting input terminal, the output voltage of the amplifier triggers high causing transistor T1 to turn "off".

With transistor T1 initially "on", transistor T2 is "on" and relay CR is energized. When the dynamic braking resistor reaches the maximum safe temperature value and transistor T1 turns "off", transistor T2 turns "off" and relay CR deenergizes to initiate the resistor protective function hereinbefore described. This switching circuit is failsafe as in FIG. 1.

While an existing low power shunt SR has been shown in FIGS. 1 and 8, this invention contemplates that other equivalent devices may be used in place thereof such as will provide a current signal without using a significant amount of power. For example, resistors R1 and R2 can be connected across a predetermined length of the stainless steel terminal strap of the dynamic braking resistor, this strap having a suitable cross-sectional area to minimize heating and resultant resistance changes. Such DB resistor typically comes in sections called boxes, are connected together and each has a terminal strap to which the power cable is connected. The signal to amplifier OP1 may alternatively be tapped across a section of this terminal strap. This has the advantage that a separate shunt external to the resistor itself need not be supplied, or if the shunt is pre-existing for some other use, no connection need be made thereto.

While the apparatus hereinbefore described is effectively adapted to fulfill the objects stated, it is to be understood that the invention is not intended to be limited to the particular preferred embodiments of resistor protection systems disclosed, inasmuch as they are susceptible of various modifications without departing from the scope of the appended claims.

We claim:

1. A resistor temperature monitoring system for providing an output control signal when the resistor temperature rises above ambient temperature comprising:
    means for deriving a temperature monitoring voltage proportional to the current in and the resistivity of the resistor being monitored;
    means for deriving a low-power, control voltage proportional to the current in the resistor being monitored;
    means for amplifying said low power control voltage;
    means for adjusting said system so that said amplified control voltage bears a predetermined initial ratio to said temperature monitoring voltage when the resistor being monitored is at ambient temperature from which said ratio changes as the temperature of the resistor rises until such ratio reaches a tripping value at the maximum safe temperature of the resistor;
    output means;
    control means operable by said voltages prior to reaching said tripping value for providing a variable operating signal;
    and means responsive to said operating signal for operating said output means.

2. The system defined in claim 1, wherein:
    said output means comprises switching means;
    and said means responsive to said operating signal comprises means for operating said switching means.

3. The system defined in claim 1, wherein:
    said output means comprises a switching circuit responsive to said variable operating signal being below said tripping value for assuming a first state and being responsive to said variable operating signal exceeding said tripping value for assuming a second state.

4. The system defined in claim 3, wherein:
    said first state is an energized state and said second state is a deenergized state thereby to provide a fail-safe system.

5. The system defined in claim 1, wherein:
    said output means comprises a temperature indicator device and means responsive to said variable operating signal for providing a read-out indicative of the temperature of the resistor being monitored.

6. The system defined in claim 1, wherein:
    said means for deriving a low-power, control voltage proportional to the current in the resistor being monitored comprises a low-power-consumption series resistor in series connection with the resistor being monitored and having a negligible temperature coefficient of resistance.

7. The system defined in claim 1, wherein:
said predetermined initial ratio is a larger value for said amplified control voltage and said tripping value is a null condition between the two voltages.

8. The system defined in claim 1, wherein:
said predetermined initial ratio is equality between said amplified control voltage and said temperature monitoring voltage and said tripping ratio is a predetermined larger value for said temperature monitoring voltage.

9. The system defined in claim 1, wherein:
said means for deriving a low power, control voltage proportional to the current in the resistor being monitored comprises a metal terminal strip of said resistor being monitored across a section of which said amplifying means is connected.

10. A dynamic braking resistor protection system for a traction motor comprising:
an armature winding for the motor;
a dynamic braking resistor;
a series resistor;
means connecting said dynamic braking resistor and said series resistor in series across said armature winding with the junction between said resistors being grounded;
means connected to said dynamic braking resistor for deriving a first voltage that is a function of the current in and the resistivity of said dynamic braking resistor during braking action;
means connected to said series resistor for deriving a second voltage that is a function of the current therein which is also a measure of the dynamic braking current;
means for adjusting the initial ratio of said first and second voltages at ambient temperature to a predetermined value and to eliminate the effect of dynamic braking current change;
and means responsive to said first and second voltages when the temperature of said dynamic braking resistor rises to a maximum safe value for initiating a protective function.

11. The system defined in claim 10, wherein:
said series resistor has a negligible temperature coefficient of resistance.

12. The system defined in claim 10, wherein:
said means connected to said series resistor for deriving a second voltage comprises an inverting operational amplifier for inverting the variable voltage on said series resistor thereby to afford a second voltage of the same polarity for comparison with said first voltage.

13. The system defined in claim 12, wherein:
said means responsive to said first and second voltages comprises a triggering, voltage comparator circuit and switching means responsive thereto.

14. The system defined in claim 13, wherein:
said triggering comparator circuit comprises a high gain operational amplifier having positive feedback.

15. The system defined in claim 10, wherein:
said provides resistor provided a low-power voltage;
and said means connected to said series resistor for deriving a second voltage comprises an operational amplifier for amplifying the low-power voltage from the series resistor.

16. The system defined in claim 15, wherein said means responsive to said first and second voltages comprises:
a divider circuit providing an output voltage proportional to the ratio of said first and second voltages when the temperature of said dynamic braking resistor is above ambient temperature;
triggering means responsive to said output voltage reaching a predetermined value;
and switching means responsive to said triggering means for initiating a protective function.

17. The system defined in claim 16, together with:
means for modifying said output voltage to have linear variation with variation of the average temperature of said dynamic braking resistor;
and a read-out device responsive to said linearly varying voltage.

* * * * *